United States Patent
Bernasconi et al.

(10) Patent No.: US 11,570,397 B2
(45) Date of Patent: Jan. 31, 2023

(54) DEINTERLACING VIA DEEP LEARNING

(71) Applicants: DISNEY ENTERPRISES, INC., Burbank, CA (US); ETH Zürich, Zürich (CH)

(72) Inventors: Michael Bernasconi, Valendas (CH); Daniel Konrad Dorda, Zurich (CH); Abdelaziz Djelouah, Zurich (CH); Shinobu Hattori, Los Angeles, CA (US); Christopher Richard Schroers, Zurich (CH)

(73) Assignees: DISNEY ENTERPRISES, INC., Burbank, CA (US); ETH ZÜRICH, (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 0 days.

(21) Appl. No.: 16/926,558

(22) Filed: Jul. 10, 2020

(65) Prior Publication Data
US 2022/0014708 A1    Jan. 13, 2022

(51) Int. Cl.
*H04N 7/01* (2006.01)
*H04N 5/14* (2006.01)

(52) U.S. Cl.
CPC ............. *H04N 7/012* (2013.01); *H04N 5/145* (2013.01)

(58) Field of Classification Search
CPC ................................ H04N 7/012; H04N 5/145
USPC ........................................................ 348/452
See application file for complete search history.

(56) References Cited

U.S. PATENT DOCUMENTS

| | | | | |
|---|---|---|---|---|
| 6,239,842 | B1 * | 5/2001 | Segman | H04N 7/012 348/441 |
| 8,120,703 | B2 * | 2/2012 | Adams | H04N 7/012 348/448 |
| 2005/0129306 | A1 * | 6/2005 | Wang | G06T 5/20 382/156 |
| 2009/0086093 | A1 * | 4/2009 | Wei | H04N 5/144 348/451 |
| 2009/0268088 | A1 * | 10/2009 | Zhou | H04N 7/012 348/452 |
| 2012/0170657 | A1 * | 7/2012 | Wang | H04N 7/014 375/240.16 |
| 2020/0154123 | A1 * | 5/2020 | Lee | H04N 19/59 |
| 2020/0219291 | A1 * | 7/2020 | Kim | H04N 19/20 |

OTHER PUBLICATIONS

Yifan Wang et al., "A Fully Progressive Approach to Single-Image Super-Resolution", Computer Vision Foundation, 2018.

(Continued)

*Primary Examiner* — Michael Lee
(74) *Attorney, Agent, or Firm* — Artegis Law Group, LLP

(57) ABSTRACT

One embodiment of the present invention sets forth a technique for performing deinterlacing. The technique includes separating a first interlaced video frame into a first sequence of fields ordered by time, the first sequence of fields including a first field. The technique also includes generating, by applying a deinterlacing network to a first field in the first sequence, a second field that is missing from the first sequence of fields and is complementary to the first field. The technique further includes constructing a progressive video frame based on the first field and the second field.

20 Claims, 5 Drawing Sheets

(56) References Cited

OTHER PUBLICATIONS

Victor Comillère et al., "Blind image super-resolution with spatially variant degradations", ACM Transactions on Graphics, Nov. 2019, Abstract.
Junhwa Hur et al., "Iterative Residual Refinement for Joint Optical Flow and Occlusion Estimation", Department of Computer Science, Apr. 2019.
AviSynth http://avisynth.nl/index.php/Nnedi3 accessed on Dec. 29, 2020.
Alexander Balakhnin, "Yadif", http://avisynth.org.ru/yadif/yadif.html accessed on Dec. 29, 2020.
Haichao Zhu et al., "Real-time Deep Video Deinterlacing", Aug. 2017.

* cited by examiner

DEINTERLACING VIA DEEP LEARNING

BACKGROUND

Field of the Various Embodiments

Embodiments of the present disclosure relate generally to deinterlacing of video frames, and more specifically, to deinterlacing of video frames via deep learning.

Description of the Related Art

Interlaced video is commonly used to double the perceived frame rate of a video display without consuming extra bandwidth or, conversely, to maintain the same frame rate while reducing data transfer or increasing the spatial resolution of the video. Each frame of interlaced video contains two fields captured at consecutive points in time; one field contains odd-numbered scan lines in the frame, and the other field contains even-numbered scan lines in the frame.

While certain types of displays (e.g., cathode ray tube (CRT)) can display interlaced video without modification (e.g., by scanning each frame of interlaced video in two passes, one for each field), modern digital displays typically support only progressive scanning, where all the lines of a frame are drawn in sequence (e.g., from top to bottom). As a result, interlaced video that is shown on these digital displays may exhibit combing artifacts when objects in the video move quickly enough to be in different positions when consecutive fields are captured.

To mitigate combing effects or other artifacts associated with displaying interlaced video on a progressive scan display, a deinterlacing process is commonly used to convert the interlaced video into a progressive form for use by the progressive scan display. This deinterlacing may include simple techniques such as "doubling" the lines of each interlaced field to fill the entire frame, averaging two consecutive fields for display as one progressive frame, and/or interpolating the missing lines from a frame given an original field. More advanced techniques include motion compensated deinterlacing, in which a missing field is reconstructed in a way that accounts for motion between objects in successive fields of the interlaced video.

However, simple deinterlacing techniques may result in loss of temporal or vertical resolution, ghosting artifacts, blurriness, or "bobbing" of stationary objects across frames. At the same time, the performance of motion compensated deinterlacing may be adversely impacted by unreliable estimation of motion between alternating interlaced fields (instead of between two full input frames) and/or occlusions of objects in the fields.

As the foregoing illustrates, what is needed in the art are techniques for improving the image quality of deinterlaced video.

SUMMARY

One embodiment of the present invention sets forth a technique for performing deinterlacing. The technique includes separating a first interlaced video frame into a first sequence of fields ordered by time, the first sequence of fields including a first field. The technique also includes generating, by applying a deinterlacing network to a first field in the first sequence, a second field that is missing from the first sequence of fields and is complementary to the first field. The technique further includes constructing a progressive video frame based on the first field and the second field.

One technological advantage of the disclosed techniques is improved deinterlacing performance over conventional deinterlacing techniques that combine two interlaced fields and/or extend a single interlaced field into a progressive frame. Another technological advantage includes reduced latency, overhead, and/or resource consumption over techniques that use two machine learning models or branches to separately deinterlace top and bottom fields in interlaced video frames. Consequently, the disclosed techniques provide technological improvements in computer systems, applications, frameworks, and/or techniques for deinterlacing video.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
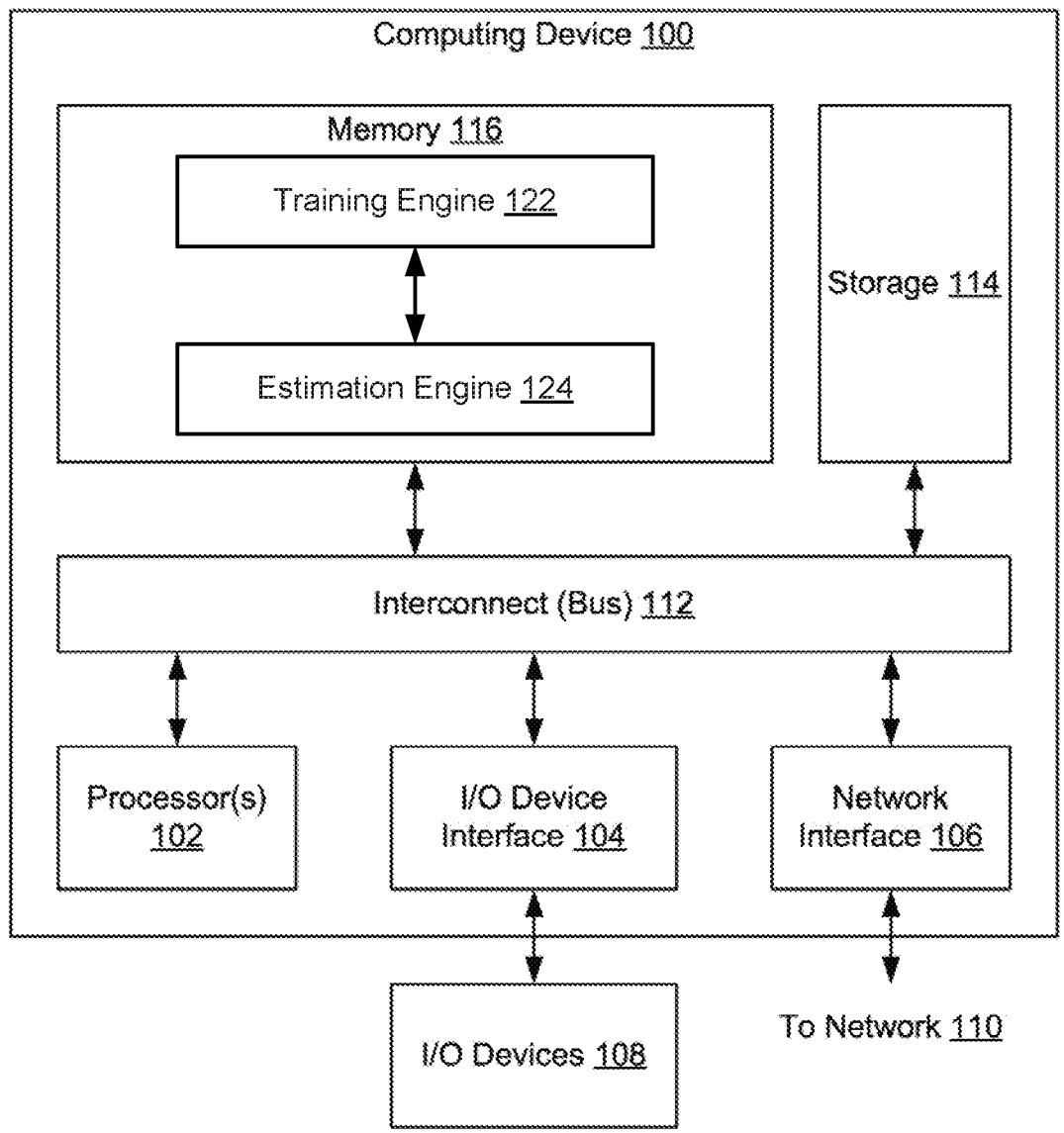
FIG. 1 illustrates a system configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and estimation engine 124 that reside in a memory 116. It is noted that the computing device described herein is illustrative and that any other technically feasible configurations fall within the scope of the present disclosure. For example, multiple instances of training engine 122 and estimation engine 124 may execute on a set of nodes in a distributed system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and estimation engine 124 may be stored in storage 114 and loaded into memory 116 when executed.

In one embodiment, memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and estimation engine 124.

Training engine 122 includes functionality to train a deep learning model to perform deinterlacing, and estimation engine 124 includes functionality to use the deep learning model to convert sequences of fields in interlaced video into progressive video frames. As described in further detail below, the deep learning model may deinterlace video in a unified manner that utilizes information from fields immediately preceding and following a given field to reconstruct a progressive video frame including the field, uses the same components to perform deinterlacing of "odd" and "even" fields, accounts for motion between consecutive fields, and/ or identifies and utilizes features that are important to reconstructing the progressive video frame. Consequently, the deep learning model may produce output that is higher quality and/or executes more efficiently than existing deinterlacing techniques.

Deinterlacing Via Deep Learning

Figure 2:
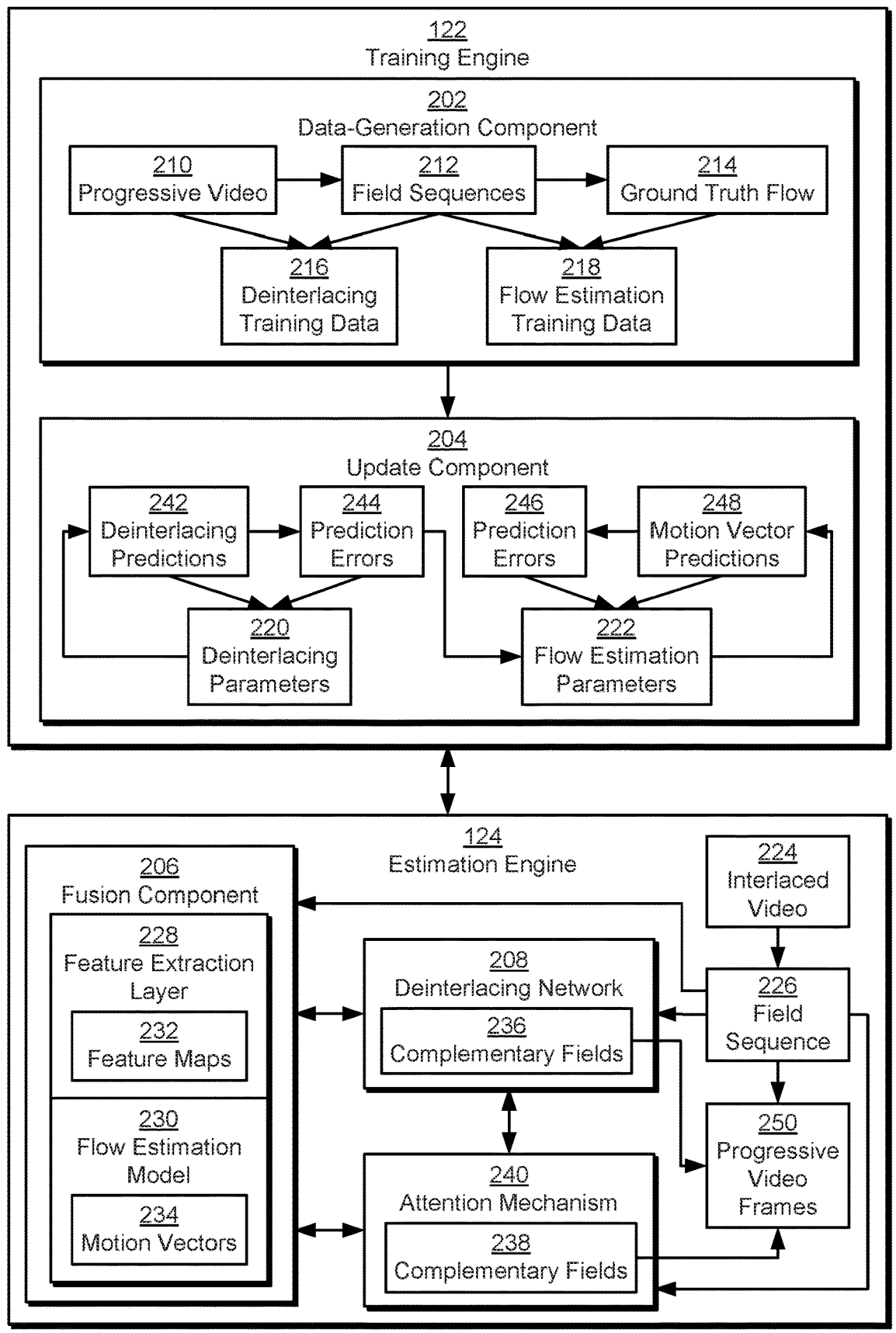
FIG. 2 is a more detailed illustration of the training engine and estimation engine of FIG. 1, according to various embodiments.

FIG. 2 is a more detailed illustration of training engine 122 and estimation engine 124 of FIG. 1, according to various embodiments. As mentioned above, training engine 122 and estimation engine 124 operate to train and execute a deep learning model that converts frames in interlaced video 224 including pairs of fields captured at different points in time into progressive video frames 250.

In one or more embodiments, interlaced video 224 includes a sequence of interlaced frames that can be displayed to convey motion to a viewer. Each frame in interlaced video 224 may include two fields captured at (or representing) consecutive points in time; one field includes odd-numbered scan lines in the frame, and the other field includes even-numbered scan lines in the frame. On the other hand, a frame of progressive video (e.g., progressive video frames 250) includes two fields that are captured at (or represent) the same point in time. A single frame of interlaced video 224 thus corresponds to two progressive video frames 250 at different points in time. In turn, deinterlacing of a frame in interlaced video 224 may involve "filling in" a field that is complementary to each field in the interlaced frame and generating a progressive video frame that includes the original field from the interlaced frame and the "filled in" complementary field.

In some embodiments, a complementary field includes a field that is used to complete a progressive video frame at a point in time, given a corresponding field from an interlaced frame. Thus, a field that includes odd-numbered scan lines representing a given point in time has a complementary field that includes even-numbered scan lines representing the same point in time. A field that includes even-numbered scan lines representing a given point in time has a complementary field that includes odd-numbered scan lines representing the same point in time.

As shown, estimation engine 124 converts frames in interlaced video 224 into a field sequence 226 that includes fields in interlaced video 224 ordered by time. For example, estimation engine 124 may obtain interlaced video 224 as a sequence of interlaced video frames. Estimation engine 124 may separate each interlaced frame into two fields and generate field sequence 226 by ordering the fields by time. As a result, the number of fields in field sequence 226 may be double the number of frames in interlaced video 224. Moreover, this ordering of fields may be performed based on whether interlaced video 224 was generated from an original video in a "top field first" or "bottom field first" manner.

Next, estimation engine 124 uses one or more components of a deep learning model to perform deinterlacing of some or all fields in field sequence 226. As shown, the deep learning model includes a deinterlacing network 208, an attention mechanism 240, and/or a fusion component 206. Each of these components is described in further detail below.

Deinterlacing network 208 receives input that includes one or more fields from field sequence 226 and generates estimates of one or more complementary fields 236 in progressive video frames 250 that include or reflect the visual characteristics of field sequence 226. In particular, deinterlacing network 208 generates, for a "top" field representing a given point in time in field sequence 226, a complementary "bottom" field for the same point in time.

Similarly, deinterlacing network 208 generates, for a "bottom" field representing a given point in time in field sequence 226, a complementary "top" field for the same point in time. Estimation engine 124 may then combine each field inputted into deinterlacing network 208 with the corresponding complementary field outputted by deinterlacing network 208 into a progressive video frame.

Deinterlacing network 208 also, or instead, includes functionality to produce, for a given input field in field sequence 226, a progressive video frame that includes the complementary field and a modified version of the input field. This conversion of an input field into an entire progressive video frame may improve coherence between adjacent pixels and/or rows in the progressive video frame, while the alternative method of predicting only the complementary field from the input field may maintain higher fidelity to the original interlaced video 224 by reusing the input field in the resulting progressive video frame.

In addition, deinterlacing network 208 may use the same layers, blocks, and/or components to predict complementary fields 236 for both top and bottom fields in field sequence 226. More specifically, predicting a complementary field for a top field is identical to predicting a complementary field for a bottom field after one of the fields is vertically flipped. Input to deinterlacing network 208 may thus be defined as a top (or bottom) field, and the output of deinterlacing network 208 may be defined as a corresponding bottom (or top) field. Deinterlacing of bottom (or top) fields may then be performed by first vertically flipping the fields to convert the fields to top (or bottom) fields before inputting the fields into deinterlacing network 208. After deinterlacing network 208 outputs a top (or bottom) field that is complementary to an inputted bottom (or top) field, the outputted field is flipped vertically for consistency with the orientation of the inputted field in interlaced video 224. The structure and/or operation of deinterlacing network 208 is described in further detail below with respect to FIG. 3A.

In some embodiments, deinterlacing network 208 includes functionality to estimate a complementary field for a given "target" field in field sequence 226 based on two types of input. The first type of input includes only the target field, and the second type of input includes a subsequence of multiple fields that includes the target field. The first type of input lacks temporal information from field sequence 226, while the second type of input provides temporal information from fields before and/or after the target field for use in estimating the complementary field.

In one or more embodiments, estimation engine 124 selects a given subsequence of fields for input into the deep learning model to include a target field for which a complementary field is to be estimated, one or more fields preceding the field in field sequence 226, and/or one or more fields succeeding the field in field sequence 226. For example, the subsequence may include three fields: a "middle" target field, one field immediately preceding the middle target field in field sequence 226, and one field immediately following the middle target field in field sequence 226. In another example, the subsequence may include five fields: the middle target field, two fields immediately preceding the middle target field in field sequence 226, and two fields immediately following the middle target field in field sequence 226. In a third example, the subsequence may include different numbers of fields immediately preceding and succeeding a target field (e.g., one field immediately preceding the target field and two fields immediately following the target field). In other words, subsequences of fields inputted into the deep learning model may include frames that both precede and succeed the target field in field sequence 226 to allow temporal information from before and after the target field to be incorporated into the complementary field.

When a single target field is supplied as input to deinterlacing network 208, estimation engine 124 may obtain a corresponding complementary field (or progressive video frame) as output of deinterlacing network 208 without utilizing fusion component 206, attention mechanism 240, and/or other components of the deep learning model. Conversely, when multiple fields in a subsequence from field sequence 226 are used to estimate a complementary field for a given field in the subsequence, estimation engine 124 may combine processing by deinterlacing network 208 with that of fusion component 206 and/or attention mechanism 240 to integrate information from the multiple fields in a way that is reflected in the estimated complementary field.

First, estimation engine 124 includes functionality to input the entire subsequence into deinterlacing network 208. For example, estimation engine 124 may concatenate fields in the subsequence along color channels and input the concatenated data into deinterlacing network 208. In turn, deinterlacing network 208 may use the concatenated data to produce a complementary field for the target field in the subsequence. Estimation engine 124 also, or instead, inputs the subsequence into fusion component 206 and uses the output of fusion component 206 as input into deinterlacing network 208. As shown, this output includes (but is not limited to) feature maps 232 generated by a feature extraction layer 228 and/or motion vectors 234 generated by a flow estimation model 230.

In one or more embodiments, feature extraction layer 228 includes one or more convolutional filters that extract feature maps 232 from individual fields in the subsequence. Feature extraction layer 228 may also include one or more additional convolutional filters that are applied to feature maps 232 to produce a combined feature map for all fields in the subsequence. The individual feature maps 232 and/or the combined feature map may then be provided as input to deinterlacing network 208, in lieu of or in addition to the raw fields in the subsequence.

In one or more embodiments, flow estimation model 230 performs optical flow estimation between consecutive frames in the subsequence. For example, flow estimation model 230 includes a deep learning model such as FlowNet, PWC-Net, and/or SpyNet that estimates optical flow between a pair of input images (e.g., a pair of fields in the subsequence). Output of the deep learning model includes two-dimensional (2D) motion vectors 234 between pixels in the input images. The performance of the deep learning model may be improved via iterative residual refinement, in which the model learns to residually refine a previous optical flow estimate using the same weights, and/or jointly estimating optical flow and occlusion of pixels in the images. In another example, flow estimation model 230 may use a Lucas-Kanade method, Horn-Schunk method, and/or another optical flow estimation technique to produce motion vectors 234 between pairs of fields in the subsequence.

Motion vectors 234 produced by flow estimation model 230 may then be inputted into deinterlacing network 208 with feature maps 232 from feature extraction layer 228 and/or concatenated fields from the subsequence. In turn, deinterlacing network 208 may use motion vectors 234 to map pixels in fields adjacent to the target field in the subsequence to locations of the pixels in the target field and/or the corresponding complementary field.

Motion vectors 234 from flow estimation model 230 may also, or instead, be used to assemble a progressive video frame and/or complementary field corresponding to the same point in time as the target field from pixels in the adjacent fields. For example, estimation engine 124 may perform motion compensated deinterlacing that uses motion vectors 234 to move pixels from fields before and after the target field into their respective locations in the complementary field. The complementary field, motion vectors 234, and/or other output related to this motion compensated deinterlacing may then be used as input into deinterlacing network 208 (in lieu of or in addition to feature maps 232 and/or the concatenated fields) to provide additional information that assists with estimation of the complementary field by deinterlacing network 208.

Estimation engine 124 additionally includes functionality to use attention mechanism 240 to combine multiple estimates of complementary fields (e.g., complementary fields 236) from deinterlacing network 208 and/or other components into final estimates of complementary fields 238 that are used to construct progressive video frames 250. As described in further detail below with respect to FIG. 3B, attention mechanism 240 may include a first set of layers that extract features from the inputted estimates, as well as a second set of layers that calculate weights by which the extracted features are scaled. As a result, complementary fields 238 outputted by attention mechanism 240 may emphasize features identified as "important" by attention mechanism 240 and de-emphasize features identified as unimportant by attention mechanism 240.

Estimation engine 124 may alternatively or additionally use attention mechanism 240 with fusion component 206 and/or other types of input into deinterlacing network 208. For example, attention mechanism 240 may be used to apply different weights to fields and/or portions of fields in the subsequence during generation of feature maps 232, motion vectors 234, and/or complementary fields 236. In another example, attention mechanism may be used to weight features associated with motion vectors 234 from flow estimation model 230 and/or pixels in a complementary field generated by a motion compensation deinterlacing technique using motion vectors 234 after motion vectors 234 and/or the complementary field are inputted into deinterlacing network 208.

In general, estimation engine 124 may include, exclude, combine, and/or order deinterlacing network 208, fusion component 206, and/or attention mechanism 240 in various ways to produce complementary fields (e.g., complementary fields 236 or 238) for target fields in field sequence 226. For example, estimation engine 124 may apply deinterlacing network 208 to one or more fields in field sequence 226 to produce progressive video frames 250 and/or complementary fields 236 that are included in progressive video frames 250. In another example, estimation engine 124 may apply feature extraction layer 228 and/or flow estimation model 230 to the field(s) and provide the resulting output of feature extraction layer 228 and/or flow estimation model 230 as input into deinterlacing network 208. This input may be provided in lieu of or in addition to the original field(s) from field sequence 226. In response to the input, deinterlacing network 208 may generate complementary fields 236 and/or progressive video frames 250. In a third example, estimation engine 124 may input the field(s), the corresponding complementary fields 236 from deinterlacing network 208, the corresponding feature maps 232 from feature extraction layer 228, and/or the corresponding motion vectors 234 from flow estimation model 230 into attention mechanism 240 to produce complementary fields 238 that are included in progressive video frames 250. Alternatively, complementary fields 238 and/or other output of attention mechanism 240 may be fed into deinterlacing network 208, and a final set of complementary fields 236 may be obtained as output of deinterlacing network 208 and used to create progressive video frames 250. In a fourth example, estimation engine 124 may perform multiple iterations that pass data among deinterlacing network 208, fusion component 206, and/or attention mechanism 240 to gradually refine the output of deinterlacing network 208, fusion component 206, and/or attention mechanism 240 until a final set of complementary fields 236 or 238 is produced for inclusion in progressive video frames 250.

Training engine 122 includes functionality to train deinterlacing network 208, feature extraction layer 228, flow estimation model 230, attention mechanism 240, and/or other components of the deep learning model in a way that adapts each component to the deinterlacing task. As shown, a data-generation component 202 in training engine 122 produces training data for the deep learning model, and an update component 204 in training engine 122 uses the training data to update parameters of the deep learning model.

More specifically, data-generation component 202 produces deinterlacing training data 216 that is used to train deinterlacing network 208, feature extraction layer 228, attention mechanism 240, and/or other components involved in deinterlacing, as well as flow estimation training data 218 that is used to train flow estimation model 230 and/or other components involved in estimating optical flow between pairs of interlaced fields. In some embodiments, deinterlacing training data 216 is generated from frames in progressive video 210 and one or more field sequences 212 extracted from those frames. For example, data-generation component 202 may extract two complementary field sequences 212 of interlaced fields from a single sequence of frames in progressive video 210. Each field sequence may be produced by alternately extracting the top and bottom fields from consecutive frames in progressive video 210. Data-generation component 202 may then use one field sequence as training input into the deinterlacing component(s) (e.g., deinterlacing network 208, feature extraction layer 228, and/or attention mechanism 240) and the other field sequence as ground truth labels for complementary fields produced by the deinterlacing component(s). In another example, data-generation component 202 may extract one field sequence of alternating interlaced fields from a sequence of frames in progressive video 210 and use the original sequence of progressive video frames as ground truth labels for progressive frames produced by the deinterlacing component(s).

Flow estimation data 218 is produced from one or more field sequences 212 of interlaced fields and ground truth flow 214 associated with pixels in pairs of consecutive fields in these field sequence(s). For example, data-generation component 202 may synthesize progressive video 210 and/or field sequences 212 to include objects with known ground truth flow 214 between pixels over time (e.g., by rendering scenes with the objects). Data-generation component 202 may then use a field sequence as training input into flow estimation model 230 and ground truth flow 214 for objects in the field sequence as labels for output produced by flow estimation model 230.

Ground truth flow 214 may additionally be adapted to the interleaved nature of interlaced field sequences 212. For example, ground truth flow 214 may include motion vectors that map pixels in a top (or bottom) field at a given point in time to pixels in the same field at the next point in time. These motion vectors may allow the same field to be constructed when the bottom (or top) field at the next point in time is known.

Update component 204 may then use deinterlacing training data 216 to update deinterlacing parameters 220 (e.g., neural network weights) of the deinterlacing component(s) and use flow estimation training data 218 to update flow estimation parameters 222 (e.g., neural network weights) of flow estimation model 230. First, update component 204 may train the deinterlacing component(s) and flow estimation model 230 separately. For example, update component 204 may provide one or more training input field sequences 212 to the deinterlacing component(s) and use a loss function to calculate prediction errors 244 between deinterlacing predictions 242 produced by the deinterlacing component(s) from the inputted field sequence(s) and the corresponding ground truth complementary field sequence(s). Update component 204 may then use a training technique (e.g., gradient descent and backpropagation) and/or one or more hyperparameters to iteratively update deinterlacing parameters 220 of the deinterlacing component(s) in a way that reduces prediction errors 244.

Continuing with the above example, update component 204 may separately provide the same training inputs and/or a different set of training input field sequences 212 to flow estimation model 230 and use a potentially different loss function to calculate a different set of prediction errors 246 between motion vector predictions 248 produced by flow estimation model 230 from the inputted field sequences and the corresponding ground truth flow 214. Update component may then use a training technique and/or one or more potentially different hyperparameters to iteratively update flow estimation parameters 222 of flow estimation model 230 in a way that reduces prediction errors 246.

In some embodiments, hyperparameters include attributes that define or control "higher-level" properties of the deinterlacing component(s) and/or flow estimation model 230. These hyperparameters are distinguished from internal parameters (e.g., deinterlacing parameters 220, flow estimation parameters 222) used by the deinterlacing component(s) and/or flow estimation model 230 to generate output from a given set of input. For example, the hyperparameters include, but are not limited to, a learning rate that controls the rate at which the internal parameters of a given model are updated during training; a configuration hyperparameter that specifies the number of blocks, layers, connections, and/or other components in the architecture of a corresponding model; and/or one or more thresholds for removing links with low weights in a neural network.

After separate training of the deinterlacing component(s) and flow estimation model 230 is complete, update component 204 may perform end-to-end training of the deinterlacing component(s) and flow estimation model 230 to optimize all components of the deep learning model for the deinterlacing task. For example, update component 204 may input the same training field sequences 212 into both the deinterlacing component(s) and flow estimation model 230 and provide motion vector predictions 248 produced by flow estimation model 230 from the inputted field sequences 212 as additional input into the deinterlacing component(s). Update component 204 may calculate prediction errors 244 between deinterlacing predictions 242 generated by the deinterlacing component(s) and the corresponding ground truth field sequences 212, backpropagate these errors across all layers of deinterlacing parameters 220 and flow estimation parameters 222, and use stochastic gradient descent to update deinterlacing parameters 220 and flow estimation parameters 222 based on the negative gradients of the backpropagated errors. The trained deinterlacing component(s) and flow estimation model 230 may then be used to estimate complementary fields (e.g., complementary fields 236, 238) and/or progressive video frames 250 from field sequence 226 in interlaced video 224, as discussed above.

Figure 3A:
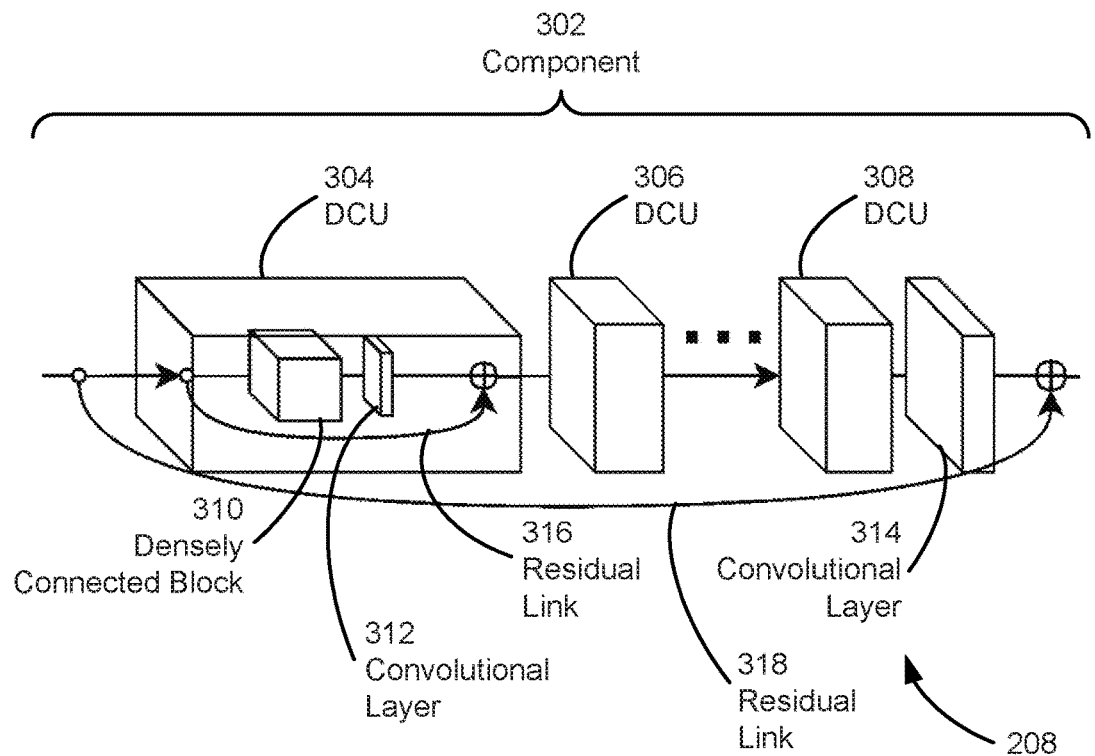
FIG. 3A is an example architecture for the deinterlacing network of FIG. 2, according to various embodiments.

FIG. 3A is an example architecture for deinterlacing network 208 of FIG. 2, according to various embodiments. As shown, the architecture includes a component 302 that is composed of a sequence of dense compression units (DCUs) 304, 306, 308 (hereinafter collectively referred to as "DCUs 304-308") followed by a convolutional layer 314. Multiple instances of component 302 may optionally be chained in the architecture to increase the size and/or capacity of deinterlacing network 208.

As illustrated with respect to DCU 304, each of DCUs 304-308 includes a densely connected block 310 followed by a convolutional layer 312. Densely connected block 310 includes a series of densely connected layers, where input to each layer in the series includes the output of all previous layers in the series. Each layer in densely connected block 310 is additionally composed of a combination of convolutional layers and activation functions, such as CONV(1,1)-RELU-CONV(3,3). Alternative versions of densely connected layers in densely connected block 310 may include batch normalization and/or other types of layers. For example, one or more densely connected layers in densely connected block 310 may be composed of BN-RELU-CONV(1,1)-RELU-CONV(3,3).

Convolutional layer 312 can be used to break dense connections between layers in densely connected block 310. For example, convolutional layer 312 may include a CONV (1,1) compression layer to reduce the dimensionality of the output of densely connected block 310.

Convolutional layer 314 may be used to convert the output of the final DCU 308 into the output of component 302 (e.g., a field that is complementary to an input field and/or a progressive video frame including the input field). For example, convolutional layer 314 includes a sub-pixel CONV(3,3) that upscales the feature map from the final layer of DCU 308 into the output of deinterlacing network 208.

The architecture additionally includes a residual link 316 that adds the input of each DCU to the output of the same DCU, as well as a residual link 318 that adds the input to component 302 to the output of convolutional layer 314. Residual links 316, 318 may be used to improve the propagation of errors and/or gradients across layers of component 302 and/or deinterlacing network 208.

Figure 3B:
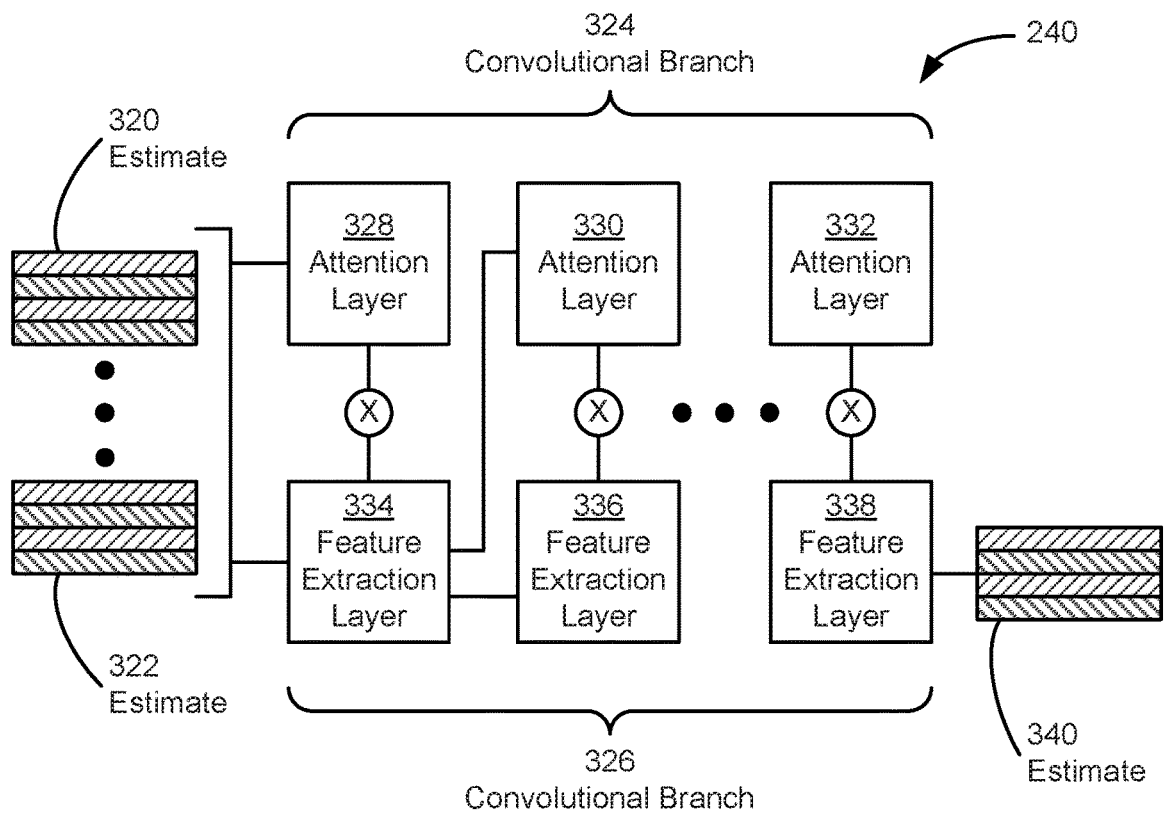
FIG. 3B is an example attention mechanism of FIG. 2, according to various embodiments.

FIG. 3B is an example attention mechanism 240 of FIG. 2, according to various embodiments. As shown, input into the example attention mechanism 240 includes a number of estimates 320-322 from other components of the deep learning model. For example, estimates 320-322 may include multiple predictions of a complementary field for a given target field. These predictions may be produced by deinterlacing network 208 from the target field, by deinterlacing network 208 from a subsequence of fields including the target field, by a motion compensation deinterlacing technique using motion vectors 234 from flow estimation model 230, and/or via another deinterlacing method.

The example attention mechanism 240 may also, or instead, accept other types of input. For example, estimates 320-322 may be replaced and/or supplemented with the subsequence of fields, feature maps 232 extracted from the subsequence of fields, motion vectors 234 between pairs of fields in the subsequence, and/or other data generated by the deep learning model of FIG. 2.

In turn, the input is fed into two different convolutional branches 324 and 326. One convolutional branch 326 includes a series of feature extraction layers 334, 336, 338 that extract convolutional feature maps from the input, and the other convolutional branch 324 includes a series of attention layers 328, 330, 332 that calculates attention weights by which the features are scaled. The output of the final feature extraction layer 338 is then used as an updated estimate 340, such as a final prediction of the complementary field (or progressive video frame) for a given target field. For example, estimate 340 may be included in one or more complementary fields 238 outputted by attention mechanism 240.

The output may also, or instead, include a combined feature map for multiple fields in the sequence, a modified set of motion vectors, and/or another type of data related to the input. This output may be provided to deinterlacing network 208 and/or other components of the deep learning model for additional processing related to estimating a complementary field (or progressive video frame) for the target field.

Figure 4:
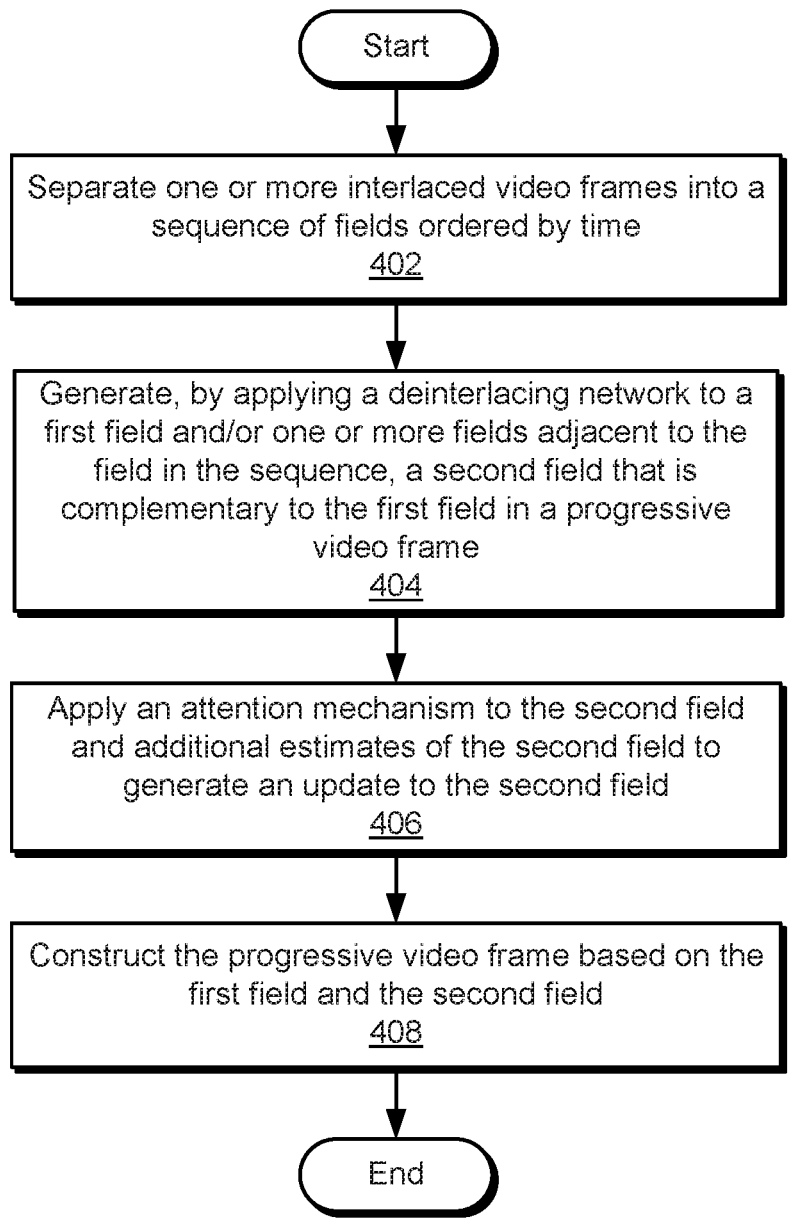
FIG. 4 is a flow chart of method steps for performing deinterlacing, according to various embodiments.

FIG. 4 is a flow chart of method steps for performing deinterlacing, according to various embodiments. Although the method steps are described in conjunction with the systems of FIGS. 1, 2, 3A, and 3B, persons skilled in the art will understand that any system configured to perform the method steps in any order falls within the scope of the present disclosure.

As shown, in step 402, estimation engine 124 separates one or more interlaced video frames into a sequence of fields ordered by time. For example, estimation engine 124 may divide a single interlaced video frame into a top field and a bottom field corresponding to different points in time. Estimation engine 124 may then create the sequence including the two fields in chronological or reverse chronological order. In another example, estimation engine 124 may separate multiple consecutive interlaced video frames into twice as many fields and order the fields by time in the sequence.

Next, in step 404, estimation engine 124 generates, by applying a deinterlacing network to a first field and/or one or more fields adjacent to the field in the sequence, a second field that is missing from the sequence and complementary to the first field. For example, estimation engine 124 may input the first field into the deinterlacing network 208 and obtain, as output from the deinterlacing network 208, an estimate of the second field and/or a progressive video frame including the second field and a modified version of the first field.

In another example, estimation engine 124 may input the first field and one or more fields preceding and succeeding the first field in the sequence into the deinterlacing network 208, a feature extraction layer 228, and/or a flow estimation model 230. The feature extraction layer 228 may produce a combined feature map 232 from the inputted fields, and the flow estimation model 230 may produce motion vectors 234 between pixels from consecutive fields in the input. The combined feature map 232, motion vectors 234, and/or a motion compensated estimation of the second field that is produced using the motion vectors 234 may then be supplied as additional input into the deinterlacing network 208, and the deinterlacing network 208 may use the inputted data to generate the second field.

In step 406, estimation engine 124 then applies an attention mechanism 240 to the second field and additional estimates of the second field to generate an update to the second field. Continuing with the above example, estimation engine 124 may input estimates of the second field produced by the deinterlacing network 208 from only the first field, by the deinterlacing network 208 from multiple input fields, by a motion compensated deinterlacing technique from the motion vectors 234, and/or by another deinterlacing method into the attention mechanism. The attention mechanism 240 may include a first convolutional branch 326 that extracts features from the estimates of the second field and a second convolutional branch 324 that calculates attention weights for scaling the features. In turn, the attention mechanism 240 may output an updated version of the second field that reflects the relative "importance" of features extracted from the estimates.

Finally, in step 408, estimation engine 124 constructs a progressive video frame (e.g., as one of progressive video frames 250) based on the first field and the second field. For example, estimation engine 124 may produce the progressive video frame by interleaving the first and second fields. Alternatively, estimation engine 124 may obtain the entire progressive video frame as output from the deinterlacing network.

Figure 5:
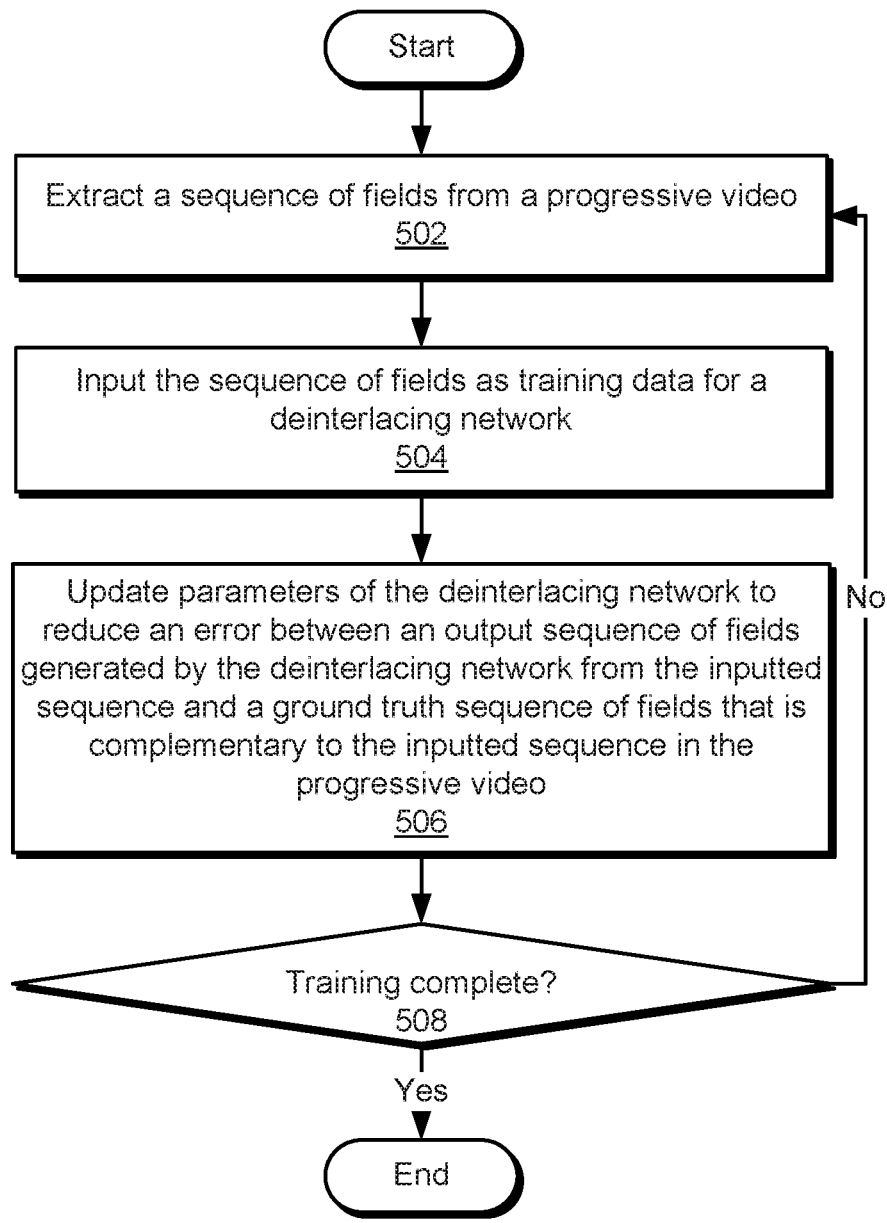
FIG. 5 is a flow chart of method steps for training a deinterlacing network, according to various embodiments.

FIG. 5 is a flow chart of method steps for training a deinterlacing network (e.g., deinterlacing network 208), according to various embodiments. Although the method steps are described in conjunction with the systems of FIGS. 1, 2, 3A, and 3B, persons skilled in the art will understand that any system configured to perform the method steps in any order falls within the scope of the present disclosure.

As shown, in step 502, training engine 122 extracts a sequence of fields 212 from a progressive video 210. For example, training engine 122 may alternately obtain top and bottom fields from consecutive frames in the progressive video 210.

Next, in step 504, training engine 122 inputs the sequence of fields 212 as training data for the deinterlacing network 208. As discussed above, input into the deinterlacing network 208 may include single "target" fields from the sequence and/or one or more additional fields that precede or succeed the target fields in the sequence.

In step 506, training engine 122 then updates parameters of the deinterlacing network (e.g., deinterlacing parameters 220) to reduce an error between an output sequence of fields generated by the deinterlacing network 208 from the inputted sequence and a ground truth sequence of fields that is complementary to the inputted sequence in the progressive video 210. For example, training engine 122 may obtain the ground truth sequence as time-ordered fields from the progressive video 210 that are complementary to the sequence extracted in step 502. Training engine 122 may use a loss function to calculate the error between the output sequence and the ground truth sequence and backpropagate the error across layers of the deinterlacing network 208. In another example, training engine 122 may calculate the error between progressive video frames outputted by the deinterlacing network 208 from the inputted sequence and the original progressive video frames from which the inputted sequence was extracted. Training engine 122 may then update parameters of the deinterlacing network in a way that reduces the error.

Training engine 122 may repeat operations 502, 504, 506 to until training of the deinterlacing network is complete. For example, step 508 may be used to evaluate whether or not a condition representing the completion of training is met. The condition may include, but is not limited to, convergence in parameters of the deinterlacing network and/or the execution of a certain number of training steps, iterations, batches, and/or epochs. If the condition is not met, training engine 122 may continue extracting sequences of fields from progressive video frames, inputting the sequences into the deinterlacing network, and updating parameters of the deinterlacing network to improve the accuracy of complementary sequences of fields (or progressive video frames) outputted by the deinterlacing network. If the condition is met, training engine 122 ends the process of training the deinterlacing network.

As mentioned above, the deinterlacing network 208 may incorporate or utilize a flow estimation model 230 that generates motion vectors 234 between pixels of consecutive fields in a sequence. Training engine 122 may initially train the flow estimation model 230 separately from the deinterlacing network 208. Training engine 122 may then perform end-to-end training of the deinterlacing network 208 and flow estimation model 230 using operations 502, 504, 506. During this end-to-end training, training engine 122 may use the same sequence of fields as input to both the flow estimation model 230 and the deinterlacing network 208 and use the output of the flow estimation model 230 as additional input into the deinterlacing network 208. Training engine 122 may then calculate an error between the complementary sequence outputted by deinterlacing network 208 and the corresponding ground truth sequence and backpropagate the error across both deinterlacing network 208 and the flow estimation model 230. As a result, motion vectors 234 outputted by the flow estimation model 230 are optimized for use by the deinterlacing network 208 in producing fields that are complementary to input fields from interlaced video frames.

In sum, the disclosed techniques utilize deep learning to perform deinterlacing of video. A deinterlacing network may be applied to a single target field of interlaced video and/or a sequence of multiple fields including the target field to produce an output field that is complementary to the target field in a progressive video frame and/or an entire progressive video frame that is visually representative of the target field. A feature extraction layer may be applied to the sequence of multiple fields to generate a combined feature map that is supplied as additional input into the deinterlacing network. A flow estimation model may also, or instead, be applied to the sequence to generate motion vectors between pixels from consecutive fields in the sequence. These motion vectors may be inputted directly into the deinterlacing network with the sequence and/or used with a motion compensated deinterlacing technique to produce an initial estimate of the complementary field that is subsequently inputted into the deinterlacing network. An attention mechanism may additionally be used to combine multiple estimates of the output field from the deinterlacing network, motion compensated deinterlacing technique, and/or other deinterlacing methods into a final estimate of the output field that is used to construct a progressive video frame.

One technological advantage of the disclosed techniques is improved deinterlacing performance over conventional deinterlacing techniques that combine two interlaced fields and/or extend a single interlaced field into a progressive video frame. Another technological advantage includes reduced latency, overhead, and/or resource consumption over techniques that use two machine learning models or branches to separately deinterlace top and bottom fields in interlaced video frames. Consequently, the disclosed techniques provide technological improvements in computer systems, applications, frameworks, and/or techniques for deinterlacing video.

1. In some embodiments, a method for performing deinterlacing comprises separating a first interlaced video frame into a first sequence of fields ordered by time, the first sequence of fields including a first field; generating, by applying a deinterlacing network to the first field, a second field that is missing from the first sequence of fields and is complementary to the first field; and constructing a progressive video frame based on the first field and the second field.

2. The method of clause 1, further comprising extracting a second sequence of fields from a progressive video; inputting the second sequence of fields as training data for the deinterlacing network; and updating parameters of the deinterlacing network to reduce an error between a third sequence of fields generated by the deinterlacing network based on the second sequence of fields and a fourth sequence of fields that is complementary to the second sequence of fields in the progressive video.

3. The method of any of clauses 1-2, further comprising adding, to the first sequence of fields, one or more fields from one or more interlaced video frames adjacent to the first interlaced video frame in an interlaced video; and applying the deinterlacing network to the first sequence of fields to produce the second field.

4. The method of any of clauses 1-3, wherein applying the deinterlacing network to the first sequence of fields comprises applying a feature extraction layer to the first sequence of fields to produce a combined feature map; and inputting the combined feature map into the deinterlacing network.

5. The method of any of clauses 1-4, wherein applying the deinterlacing network to the first sequence of fields comprises applying a flow estimation model to the first sequence of fields to produce one or more motion vectors between pixels from consecutive fields in the first sequence of fields; and inputting the one or more motion vectors with the first sequence of fields into the deinterlacing network.

6. The method of any of clauses 1-5, wherein the one or more fields comprise a third field preceding the first field and a fourth field succeeding the first field.

7. The method of any of clauses 1-6, further comprising applying an attention mechanism to the second field and additional estimates of the second field to generate an update to the second field prior to constructing the progressive video frame.

8. The method of any of clauses 1-7, wherein the attention mechanism comprises a first convolutional branch that extracts features from the second field and the additional estimates of the second field, and a second convolutional branch that calculates attention weights for scaling the features.

9. The method of any of clauses 1-8, wherein the deinterlacing network comprises a sequence of dense compression units, each of the dense compression units comprising a set of densely connected layers and a convolutional layer.

10. The method of any of clauses 1-9, wherein the deinterlacing network further comprises a first residual link from a first input to the deinterlacing network to a first output of the deinterlacing network, and a second residual link from a second input of a dense compression unit to a second output of the dense compression unit.

11. The method of any of clauses 1-10, wherein applying the deinterlacing network to the first field comprises inputting a vertical flip of the first field into the deinterlacing network.

12. The method of any of clauses 1-11, wherein constructing the progressive video frame comprises combining the first field and the second field into the progressive video frame.

13. In some embodiments, a non-transitory computer readable medium stores instructions that, when executed by a processor, cause the processor to perform the steps of separating a first interlaced video frame into a first sequence of fields ordered by time, the first sequence of fields including a first field; generating, by applying a deinterlacing network to the first field, a second field that is missing from the first sequence of fields and is complementary to the first field in a progressive video frame; and constructing a progressive video frame based on the first field and the second field.

14. The non-transitory computer readable medium of clause 13, wherein the steps further comprise extracting a second sequence of fields from a progressive video; inputting the second sequence of fields as training data for the deinterlacing network; and updating parameters of the deinterlacing network to reduce an error between a third sequence of fields generated by the deinterlacing network from the second sequence of fields and a fourth sequence of fields that is complementary to the second sequence of fields in the progressive video.

15. The non-transitory computer readable medium of any of clauses 13-14, wherein the steps further comprise adding, to the first sequence of fields, one or more fields from one or more interlaced video frames adjacent to the first interlaced video frame in an interlaced video; and applying the deinterlacing network to the first sequence of fields to produce the second field.

16. The non-transitory computer readable medium of any of clauses 13-15, wherein applying the deinterlacing network to the first sequence of fields comprises applying a feature extraction layer to the first sequence of fields to produce a combined feature map; and inputting the combined feature map into the deinterlacing network.

17. The non-transitory computer readable medium of any of clauses 13-16, wherein applying the deinterlacing network to the first sequence of fields comprises applying a flow estimation model to the first sequence of fields to produce one or more motion vectors between pixels from consecutive fields in the first sequence of fields; generating a motion compensated estimation of the second field based on the one or more motion vectors; and inputting the motion compensated estimation of the second field with the first sequence of fields into the deinterlacing network.

18. The non-transitory computer readable medium of any of clauses 13-17, wherein the steps further comprise applying an attention mechanism to the second field and additional estimates of the second field to generate an update to the second field prior to constructing the progressive video frame.

19. The non-transitory computer readable medium of any of clauses 13-18, wherein constructing the progressive video frame comprises obtaining the progressive video frame as output from the deinterlacing network.

20. In some embodiments, a system comprises a memory that stores instructions, and a processor that is coupled to the memory and, when executing the instructions, is configured to separate a first interlaced video frame into a first sequence of fields ordered by time, the first sequence of fields including a first field; generate, by applying a deinterlacing network to the first field, a second field that is missing from the first sequence of fields and is complementary to the first field; and construct a progressive video frame based on the first field and the second field.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for performing deinterlacing, comprising:
separating a first interlaced video frame into a first sequence of fields ordered by time, the first sequence of fields including a first field representing a first point in time and a second field representing a second point in time that is different from the first point in time;
generating, by applying a machine learning model comprising a deinterlacing network that includes one or more residual links to the first field in the first sequence of fields, a third field that is missing from the first sequence of fields and is complementary to the first field; and
constructing a progressive video frame based on the first field and the third field.

2. The method of claim 1, further comprising:
extracting a second sequence of fields from a progressive video;
inputting the second sequence of fields as training data for the deinterlacing network; and
updating parameters of the deinterlacing network to reduce an error between a third sequence of fields generated by the deinterlacing network based on the second sequence of fields and a fourth sequence of fields that is complementary to the second sequence of fields in the progressive video.

3. The method of claim 1, further comprising:
adding, to the first sequence of fields, one or more fields from one or more interlaced video frames adjacent to the first interlaced video frame in an interlaced video; and
applying the deinterlacing network to the first sequence of fields to generate the third field.

4. The method of claim 3, wherein applying the deinterlacing network to the first sequence of fields comprises:
applying a feature extraction layer to the first sequence of fields to generate a combined feature map; and
inputting the combined feature map into the deinterlacing network.

5. The method of claim 3, wherein applying the deinterlacing network to the first sequence of fields comprises:
applying a flow estimation model to the first sequence of fields to generate one or more motion vectors between pixels from consecutive fields in the first sequence of fields; and
inputting the one or more motion vectors with the first sequence of fields into the deinterlacing network.

6. The method of claim 3, wherein the one or more fields comprise a fourth field that precedes or succeeds the first field within the first sequence of fields.

7. The method of claim 1, further comprising applying an attention mechanism to the third field and additional estimates of the third field to generate an update to the third field prior to constructing the progressive video frame.

8. The method of claim 7, wherein the attention mechanism comprises a first convolutional branch that extracts features from the third field and the additional estimates of the third field, and a second convolutional branch that calculates attention weights for scaling the features.

9. The method of claim 1, wherein the deinterlacing network comprises a sequence of dense compression units, each of the dense compression units comprising a set of densely connected layers and a convolutional layer.

10. The method of claim 1, wherein the one or more residual links include a first residual link from a first input to the deinterlacing network to a first output of the deinterlacing network, and a second residual link from a second input of a dense compression unit to a second output of the dense compression unit.

11. The method of claim 1, wherein applying the deinterlacing network to the first field comprises inputting a vertical flip of the first field into the deinterlacing network.

12. The method of claim 1, wherein constructing the progressive video frame comprises combining the first field and the third field into the progressive video frame.

13. A non-transitory computer readable medium storing instructions that, when executed by a processor, cause the processor to perform the steps of:
separating a first interlaced video frame into a first sequence of fields ordered by time, the first sequence of fields including a first field representing a first point in time and a second field representing a second point in time that is different from the first point in time;
adding, to the first sequence of fields, one or more fields from one or more frames adjacent to the first interlaced video frame within an interlaced video;
generating, by applying a machine learning model that comprises a deinterlacing network to the first sequence of fields, a third field that is missing from the first sequence of fields and is complementary to the first field in a progressive video frame; and
constructing a progressive video frame based on the first field and the third field.

14. The non-transitory computer readable medium of claim 13, wherein the steps further comprise:
extracting a second sequence of fields from a progressive video;
inputting the second sequence of fields as training data for the deinterlacing network; and
updating parameters of the deinterlacing network to reduce an error between a third sequence of fields generated by the deinterlacing network from the second sequence of fields and a fourth sequence of fields that is complementary to the second sequence of fields in the progressive video.

15. The non-transitory computer readable medium of claim 13, wherein
the first sequence of fields comprises a fourth field that precedes or succeeds the first field within the interlaced video.

16. The non-transitory computer readable medium of claim 13, wherein applying the deinterlacing network to the first sequence of fields comprises:
applying a feature extraction layer to the first sequence of fields to generate a combined feature map; and
inputting the combined feature map into the deinterlacing network.

17. The non-transitory computer readable medium of claim 13, wherein applying the deinterlacing network to the first sequence of fields comprises:
applying a flow estimation model to the first sequence of fields to generate one or more motion vectors between pixels from consecutive fields in the first sequence of fields;
generating a motion compensated estimation of the third field based on the one or more motion vectors; and
inputting the motion compensated estimation of the third field with the first sequence of fields into the deinterlacing network.

18. The non-transitory computer readable medium of claim 13, wherein the steps further comprise applying an attention mechanism to the third field and additional estimates of the third field to generate an update to the third field prior to constructing the progressive video frame.

19. The non-transitory computer readable medium of claim 13, wherein constructing the progressive video frame comprises obtaining the progressive video frame as output from the deinterlacing network.

20. A system, comprising:
a memory that stores instructions, and
a processor that is coupled to the memory and, when executing the instructions, is configured to:
separate a first interlaced video frame into a first sequence of fields ordered by time, the first sequence of fields including a first field representing a first point in time and a second field representing a second point in time that is different from the first point in time;
generate, by applying a machine learning model comprising a deinterlacing network that includes one or more residual links to the first field in the first sequence of fields, a third field that is missing from the first sequence of fields and is complementary to the first field; and
construct a progressive video frame based on the first field and the third field.

* * * * *

UNITED STATES PATENT AND TRADEMARK OFFICE
CERTIFICATE OF CORRECTION

| | | |
|---|---|---|
| PATENT NO. | : 11,570,397 B2 | Page 1 of 1 |
| APPLICATION NO. | : 16/926558 | |
| DATED | : January 31, 2023 | |
| INVENTOR(S) | : Michael Bernasconi et al. | |

It is certified that error appears in the above-identified patent and that said Letters Patent is hereby corrected as shown below:

On the Title Page

(56) References Cited:
Please delete "Victor Comillère et al., "Blind image super-resolution with spatially variant degradations", ACM Transactions on Graphics, Nov. 2019, Abstract." and insert --Victor Cornillère et al., "Blind image super-resolution with spatially variant degradations", ACM Transactions on Graphics, Nov. 2019, Abstract.--.

Signed and Sealed this
Twenty-first Day of March, 2023

Katherine Kelly Vidal
*Director of the United States Patent and Trademark Office*